Patented June 1, 1943

2,320,649

UNITED STATES PATENT OFFICE 2,320,649

COFFEE MOLDING COMPOUND

Herbert S. Polin, New York, N. Y.

No Drawing. Application August 7, 1940,
Serial No. 351,666

1 Claim. (Cl. 260—3)

The present invention deals with the development of a molding compound from the berry and bean of the genus coffee as described in my Patent No. 2,207,069 issued July 9, 1940, and more particularly with an improvement thereon. This improvement consists of combining with the molding compound, the product of the aforementioned invention, other materials and compounds which may modify the physical properties of the coffee compound.

Materials with which the coffee molding compound may be advantageously combined are of a wide variety, such as the phenolic resins, the urea resins, and other types of thermo-setting resins, as well as the acetates, acrylics, vinyls, and other types of the thermo-plastic resins, and the rubbers, from the crude latex to the rubber hydrochlorides.

The fact that the coffee molding compound exhibits compatibility with this wide range of materials is probably due to its complex nature, inasmuch as the chemistry of the coffee contains elements directly related to the aldehydes, proteins, tannins, glycerides, etc., which are represented in the additives above-mentioned. The phenolics, ureas, acetates, the vinyls, the polystyrenes, the acrylics, and the rubber, etc., vary in price, but their lowest cost based upon the present carload quotations for phenol and formaldehyde is substantially greater than the cost of the product obtained from coffee. What I have discovered as a new and useful formula is that the aforementioned higher priced materials may be combined with the lower-cost coffee molding composition to produce a composition which has many or all of the advantageous properties of the higher-priced material with a reduction in the over-all cost to the extent which the coffee molding compound is itself employed. The use of the coffee molding compound in conjunction with the other molding compounds heretofore mentioned must not be confused with the so-called "filler" agencies which are universally used to lend special physical properties to, and to reduce the cost of, the molding compounds. These filler compounds are usually materials which in themselves have no molding properties, and are frequently an adulteration solely to lower the price of the more expensive resinous base material. The extent to which a normal base resin may be acceptably adulterated is never more than 50%, and no commercial article of any importance is composed of a molding compound containing more than 30% of filler.

However, in the instance of the coffee plastic, it may be used to the extent of 90 to 95% or more in combination with any of the above-named materials or the like, and will suffer no loss of physical properties itself, nor reduce the mechanical strength and like properties of the lower-percentage material.

An interesting example of the new product is that composed of 90% coffee molding compound and 10% latex rubber. Molded into tiles, the resultant material has a rubbery texture and resilience ideally suited for use as a floor covering. In cost, of course, the material has the advantage of being composed 90% of the very low-cost coffee molding compound, and would sell for considerably less than a similar tile made throughout from rubber.

The combining of the coffee molding compound with other materials may, of course, be done in the powder form, just prior to molding. A preferred embodiment is to homogenize the combined materials just prior to the vacuum-drying stage in the production of the coffee molding compound. This is accomplished by mixing the materials in the desired proportions, with the addition of a solvent if necessary, and permitting the combined mixed material to enter the vacuum-drying stage to completion exactly as is done for the coffee molding compound alone.

Having thus described my invention and a method for practicing it which results in a new and useful material, what I claim for Letters Patent is:

A plastic comprising a relatively small percentage of rubber material, and a relatively larger percentage of a moldable plastic product of reaction, under heat and pressure, of constituents of the coffee bean from which a substantial part of the oils have been removed.

HERBERT S. POLIN.